United States Patent Office 2,738,368
Patented Mar. 13, 1956

2,738,368

PREPARATION OF ACRYLIC ANHYDRIDE

Walter A. Raczynski, Elkton, Md., assignor to Hercules Powder Company, Wilmington, Del., a corporation of Delaware No Drawing. Application December 29, 1951,
Serial No. 264,258

6 Claims. (Cl. 260—546)

This invention relates to a process for preparing acrylic anhydride and, more particularly, to the preparation of acrylic anhydride from acrylic acid and acetylene.

It is well-known that acrylic anhydride may be prepared by reacting acrylic acid with diketene whereby the anhydride is formed and acetone is produced as a by-product. Acrylic anhydride has also been prepared by heating acrylic acid with acetic anhydride, acetic acid being obtained as a by-product. Both of these preparations call for the use of costly ingredients and the yields which are obtained by these processes are low. Consequently, neither of these processes is desirable for the commercial production of this anhydride. It is also known that acrylic acid may be produced by the carbonylation of acetylene. However, it has not previously been possible to apply this reaction to the preparation of acrylic anhydride.

Now in accordance with this invention, it has been found that acrylic anhydride may be prepared in high yields by a commercially feasible process by the reaction of acrylic acid with acetylene and nickel carbonyl in an inert organic solvent. This process not only makes it possible to produce acrylic anhydride in high yield but also utilizes the cheap raw material, acetylene. In addition, it yields as a by-product nickel acrylate from which nickel carbonyl and acrylic acid are easily regenerated and may then be recycled. Thus, great overall economies may be realized by carrying out the preparation of acrylic anhydride by the process of this invention.

The following examples will illustrate the process of preparing acrylic anhydride in accordance with this invention. All parts and percentages are by weight unless otherwise indicated.

Example 1

Six hundred parts of acrylic acid and 0.2 part of hydroquinone were dissolved in 500 parts of ethylene dichloride. Acetylene was passed into this solution with agitation at a slight positive pressure and 227 parts of nickel carbonyl was then added slowly. The reaction temperature was held at 40°–50° C. until the gas absorption had substantially ceased. The precipitated nickel acrylate was removed by filtration and the solvent was removed from the filtrate by distillation at 60° C. under 20 mm. pressure. The acrylic anhydride which remained as a residue was of a high degree of purity containing only traces of acrylic acid and amounted to 88.3% of the theoretical yield.

Example 2

Example 1 was repeated except that toluene was used in place of ethylene dichloride as the solvent for the reaction. The yield of acrylic anhydride obtained was 83.0% of the theoretical amount.

Example 3

Acetylene was passed into an agitated solution of 514 parts of acrylic acid in 540 parts of ethylene dichloride at 5–10 lbs. pressure. Nickel carbonyl (199 parts) was slowly added, the temperature being held at 40°–50° C. throughout the reaction. The resulting slurry was filtered, the filter cake was reslurried with ethylene dichloride and the slurry filtered and this process again repeated. The solvent was then removed from the combined filtrates by distillation under reduced pressure. The acrylic anhydride so obtained amounted to a yield of 86.9% of the theoretical yield.

In accordance with this invention, acrylic anhydride may be prepared by reacting acrylic acid, acetylene, and nickel carbonyl together in an inert solvent medium. The reaction is most simply carried out by passing acetylene into a solution of the acrylic acid and nickel carbonyl with adequate agitation or dispersion of the gas through the liquid medium. However, any other method of conducting the reaction may be used as, for example, bringing the liquid and gas phases into contact in a reaction vessel by either concurrent or countercurrent flow.

Any inert organic solvent may be used as the medium for the reaction, provided that it is a solvent for both acrylic acid and acrylic anhydride and is inert in the reaction; i. e., does not react with the reactants or the product under the conditions of the reaction and at the same time is not a solvent for the nickel acrylate which is formed in the reaction. Exemplary of the solvents which may be used are chlorinated hydrocarbons as, for example, alkyl halides such as ethylene dichloride, propylene dichloride, etc., aryl halides such as chlorobenzene, etc., hydrocarbon solvents such as benzene, toluene, hexane, heptane, etc., ethers such as dioxane, diethyl ether, diisopropyl ether, etc., and many other similar types of solvents. The amount of solvent used for the reaction may be varied over a wide range, but should be at least that amount which will provide adequate dilution, and preferably is such as will not increase the bulk of the reaction mixture to an unwieldy degree. In general, an amount of from about 25% to about 400%, and preferably from about 40% to about 150%, based on the weight of the acrylic acid being reacted is used.

The reaction in accordance with this invention is carried out by heating the three reactants in the inert diluent to a temperature of from about 40° C. to about 100° C., preferably to a temperature of from about 40° C. to about 80° C., and more preferably to a temperature of from about 40° C. to about 50° C. For optimum yields the reaction is continued until the acid number has been substantially decreased preferably to an acid number of 30 or less. Any desired pressure may be used from subatmospheric to superatmospheric, but preferably is atmospheric or just slightly above atmospheric pressure.

Any proportion of the three reactants may be used. However, since the process takes place by the stoichiometric reaction of 6 moles of acrylic acid, 4 moles of acetylene, and 1 mole of nickel carbonyl, for optimum yields there is preferably used at least 1 mole of nickel carbonyl for every 6 moles of acrylic acid reacted. Larger amounts may be used if desired.

If desired, a polymerization inhibitor may be added to the reaction mixture to prevent polymerization of the acrylic acid or the acrylic anhydride, which polymerization may occur during the actual reaction or during the purification of the anhydride. While excellent yields may be obtained in the absence of the polymerization inhibitor, any possibility of polymerization of the product and the decrease in the yield of anhydride thereby is eliminated by incorporating a polymerization inhibitor. Any agent known to inhibit the polymerization of polymerizable compounds such as the acrylic acid and acrylic anhydride present in this reaction may be used. Exemplary of such agents are hydroquinone, p-cresol, methylene blue, etc. The amount of the inhibiting agent which is incorporated is not critical but should be at least that amount which will inhibit polymerization of these materials under the conditions of the reaction and recovery of the product.

When produced in accordance with the process of this invention, the acrylic anhydride is readily separated from the reaction mixture and purified. The two by-products which are produced by the reaction are hydrogen and nickel acrylate, the former passing out of the reaction mixture and the latter being insoluble in the reaction medium and precipitating as it is formed. The nickel acrylate is then easily separated from the reaction mixture by filtration or centrifugation and the anhydride may then be recovered by distillation of the solvent from the filtrate, leaving the nearly pure acrylic anhydride as a residue. The process may be operated either batchwise or continuously.

The apparatus used for carrying out the reaction should be made of or lined with a material which is resistant to organic acids, particularly acrylic acid. Suitable materials for the fabrication or lining of the apparatus are glass, enamel, stainless steel, platinum, etc.

What I claim and desire to protect by Letters Patent is:

1. The process of preparing acrylic anhydride which comprises heating a mixture consisting of acrylic acid, acetylene, and nickel carbonyl in an inert organic solvent to a temperature of from about 40° C. to about 100° C.

2. The process of preparing acrylic anhydride which comprises heating a mixture consisting of acrylic acid, acetylene, and nickel carbonyl in an inert organic solvent to a temperature of from about 40° C. to about 80° C.

3. The process of preparing acrylic anhydride which comprises heating a mixture consisting of acrylic acid, acetylene, and nickel carbonyl in ethylene dichloride to a temperature of from about 40° C. to about 80° C.

4. The process of preparing acrylic anhydride which comprises heating a mixture consisting of acrylic acid, acetylene, and nickel carbonyl in ethylene dichloride to a temperature of from about 40° C. to about 50° C.

5. The process of preparing acrylic anhydride which comprises heating a mixture consisting of acrylic acid, acetylene, and nickel carbonyl in ethylene dichloride to a temperature of from about 40° C. to about 50° C., removing the precipitated nickel acrylate so formed and recovering the acrylic anhydride from the liquid residue.

6. The process of claim 1 carried out in the presence of a polymerization inhibitor.

References Cited in the file of this patent

UNITED STATES PATENTS

| | | |
|---|---|---|
| 2,319,070 | Lowe et al. | May 11, 1943 |
| 2,476,859 | Hagemeyer | July 19, 1949 |
| 2,497,304 | Gresham et al. | Feb. 14, 1950 |
| 2,613,222 | Specht et al. | Oct. 7, 1952 |

OTHER REFERENCES

Reppe: Acetylene Chemistry, P. B. Report 18852–S (1949), pp. 152, 155, 156, 184, 185.